United States Patent
Scoca et al.

(10) Patent No.: US 8,130,592 B2
(45) Date of Patent: Mar. 6, 2012

(54) CORRELATION METHOD FOR SONAR OR RADAR

(75) Inventors: Anthony L. Scoca, Hicksville, NY (US); James G. Huber, North Babylon, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 427 days.

(21) Appl. No.: 12/399,947

(22) Filed: Mar. 7, 2009

(65) Prior Publication Data

US 2011/0182146 A1    Jul. 28, 2011

(51) Int. Cl.
*G01S 15/00* (2006.01)
(52) U.S. Cl. ......................................... 367/89
(58) Field of Classification Search .................... 367/87, 367/89
See application file for complete search history.

(56) References Cited

U.S. PATENT DOCUMENTS

| | | | | |
|---|---|---|---|---|
| 4,168,582 | A | * | 9/1979 | Heidrich ............................ 434/2 |
| 4,244,026 | A | * | 1/1981 | Dickey, Jr. .................... 702/143 |
| 4,626,217 | A | * | 12/1986 | Tardif et al. ........................ 434/8 |
| 5,230,339 | A | * | 7/1993 | Charlebois ..................... 600/437 |
| 5,315,562 | A | * | 5/1994 | Bradley et al. .................. 367/89 |
| 5,422,860 | A | * | 6/1995 | Bradley et al. .................. 367/89 |
| 7,295,492 | B2 | | 11/2007 | Scoca et al. |
| 2004/0165479 | A1 | * | 8/2004 | Scoca et al. .................. 367/100 |
| 2006/0056273 | A1 | * | 3/2006 | Scoca et al. ..................... 367/99 |
| 2006/0171255 | A1 | * | 8/2006 | Zhu et al. ........................ 367/89 |
| 2007/0064537 | A1 | * | 3/2007 | Huber et al. ..................... 367/89 |
| 2007/0129910 | A1 | * | 6/2007 | Zhu et al. ...................... 702/143 |

* cited by examiner

*Primary Examiner* — Thomas Tarcza
*Assistant Examiner* — James Hulka
(74) *Attorney, Agent, or Firm* — DeMont & Breyer, LLC

(57) ABSTRACT

A method for improving the accuracy of velocity-measuring spatial correlation SONAR or RADAR is disclosed. The method uses data from multiple receiver pairs for each velocity vector, thereby providing improved utilization of a fixed sized receiver array.

14 Claims, 6 Drawing Sheets

CORRELATION METHOD FOR SONAR OR RADAR

FIELD OF THE INVENTION

The present invention relates generally to velocity-measuring correlation SONAR or RADAR systems.

BACKGROUND OF THE INVENTION

A velocity-measuring correlation SONAR or RADAR functions by correlating a first echo of a first transmitted pulse received at a first receiver with a first echo from a later-transmitted pulse received at a second receiver. Maximum correlation occurs when the ray path of the initial transmission (e.g., from the transmitter to the ocean floor and back to the first receiver, etc.) is equal to the ray path of the second transmission. The velocity of the vessel is calculated based upon the distance traveled by the vessel between the transmission and reception of the pulses. See, for example, U.S. Pat. No. 4,244,026 to Dickey and U.S. Pat. No. 5,315,562 to Bradley et al.

Examples of velocity-measurement SONARs are spatial correlation SONAR and temporal correlation SONAR, which rely on selecting a maximum correlation between hydrophones in the case of spatial correlation or pulses in the case of temporal correlation.

Spatial correlation SONAR calculates the velocity of a vessel by transmitting two or more pulses towards the ocean bottom, detecting echoes of the pulses on a planar two-dimensional array of hydrophones, determining which two hydrophones in the array correlate the best, and dividing the distance between those hydrophones by twice the time differential between the pulses. Peak correlation might take place between hydrophones, in which case an interpolation scheme is used. Since the later echo is received on a number of receivers located in the two-dimensional array, a velocity solution can be estimated for more than a single direction (e.g., forward and athwart components, etc.).

Velocity estimates from correlation SONARs are subject to accuracy degradation due to various random and bias errors, and accuracy is particularly degraded under extended operational conditions, such as shallow ocean bottom depths and high ship's speed.

The prior art has attempted to improve the accuracy of velocity-measuring spatial correlation SONARs via a variety of techniques, including (1) processing more data via increased processing throughput, (2) altering the physical dimensions of the hydrophone array, (3) altering the number of hydrophones in the array, (4) modifications to transmit pulses and/or pulse patterns, and (5) applying temporal correlation SONAR techniques, among others.

A further approach to improving the accuracy of velocity-measuring correlations SONARs was patented by the present inventors in U.S. Pat. No. 7,295,492. The method disclosed therein develops multiple velocity estimates using different receiver pairs. The velocity estimates are filtered to yield a single improved velocity solution.

It would be beneficial to improve the accuracy of velocity-measuring spatial correlation SONARs via a method that (1) does not physically alter an existing receiver array, (2) is less-processing intensive than prior art enhanced-processing approaches, and (3) provides particularly improved accuracy under extended operational conditions.

SUMMARY OF THE INVENTION

The illustrative embodiment of the present invention provides an improvement in velocity-measurement accuracy of a spatial correlation SONAR. After reading this specification, those skilled in the art will be able to apply the techniques described herein to RADAR (RAdio Detection And Ranging).

In accordance with the illustrative embodiment of the invention, multiple receiver (e.g., hydrophone channel, etc.) pair data is utilized for each velocity vector. In some embodiments all available receiver pair data is used for each velocity vector. That is, multiple (or all) receiver pairs are correlated and these correlations are combined for each velocity matrix position. This yields a single matrix of combined correlation values. The method executes the velocity solution using the array with these combined correlations.

In the illustrative embodiment, receiver pair data is correlated on a data sample by sample basis and then all those samples are summed to form a matrix element. A data sample is typically a pair of in-Phase (I) and Quadrature (Q) values formed as a result of receiving echo data on an array of sensors (such as hydrophones), amplification, analog-to-digital conversion, band pass filtering, and base-banding.

In an alternative embodiment, a correlation is formed for a pair of receiver channels as per the prior art, but then this correlation process is repeated for up to all available receiver pairs which support the velocity vector for a particular matrix element. These elements are then combined to yield a final matrix element.

The methods described herein result in a more efficient use of a fixed-size hydrophone array for all operating conditions and are particularly beneficial for improving velocity solutions in extended operational environments such as high ship's speed or shallow ocean-bottom depths.

DETAILED DESCRIPTION

Figure 1:
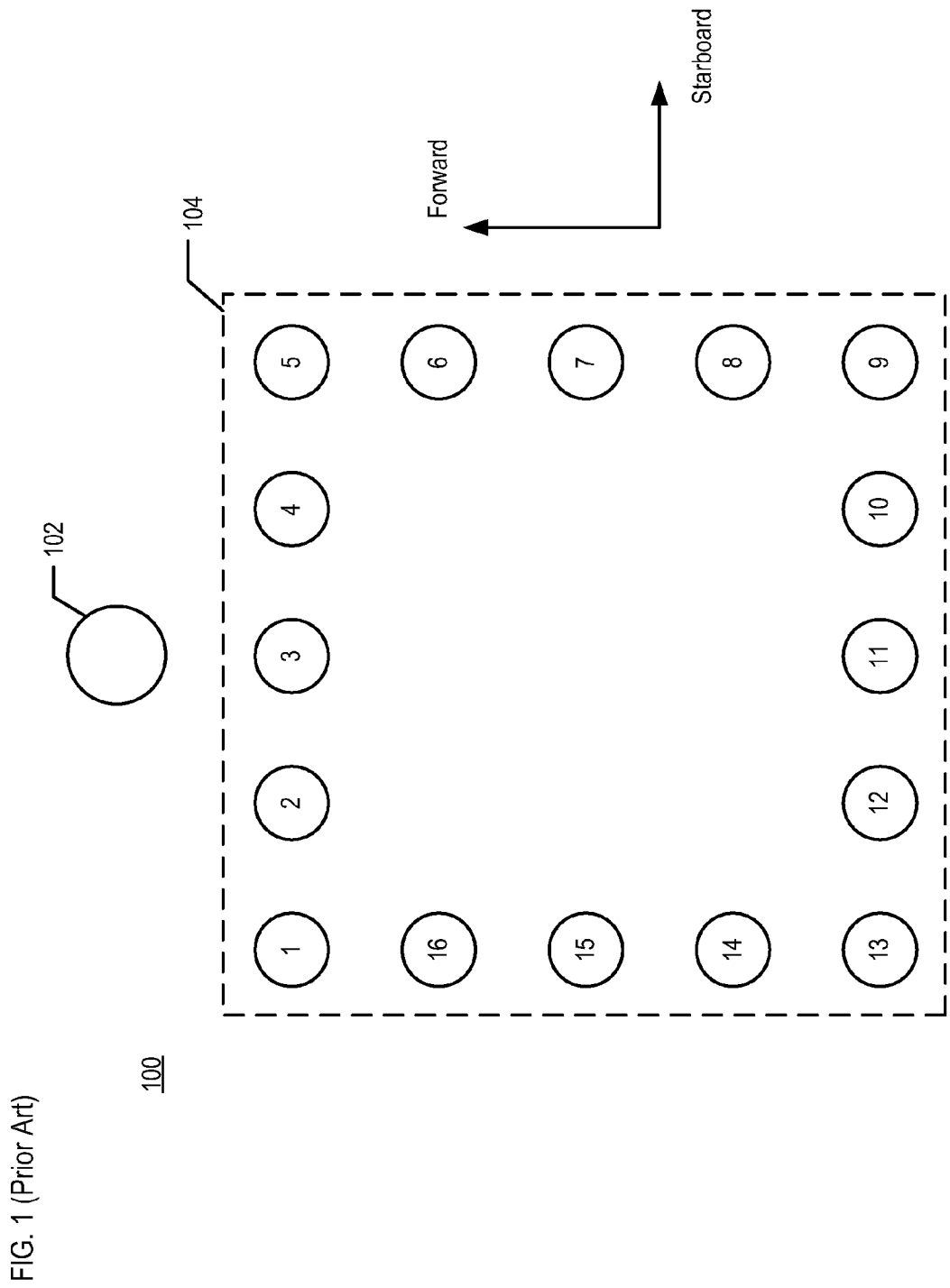
FIG. 1 depicts a schematic diagram of prior-art, spatial correlation SONAR transceiver system 100.

FIG. 1 depicts a schematic diagram of prior-art, spatial correlation SONAR transceiver system 100 for transmitting and receiving signals for measuring velocity, among any other purposes. System 100, which may be mounted on the underside of a ship, comprises transmitter 102 and receiver array 104. Receiver array 104 comprises receivers 1 through 16, wherein each receiver is commonly referred to as a "hydrophone." The terms "receiver" and "hydrophone" are used interchangeably herein.

Transceiver system 100 interfaces with other equipment (not depicted), such as amplifiers, analog-to-digital converters, digital filters, processors, and the like for processing the signals received by array 104 to ultimately provide a velocity solution.

The hydrophone arrangement depicted as array 104 is a typical prior-art hydrophone array. Array 104 is considered here for pedagogical purposes; after reading this specification, those skilled in the art will appreciate that the embodiments described herein are applicable to other transceiver systems as well.

Figure 2:
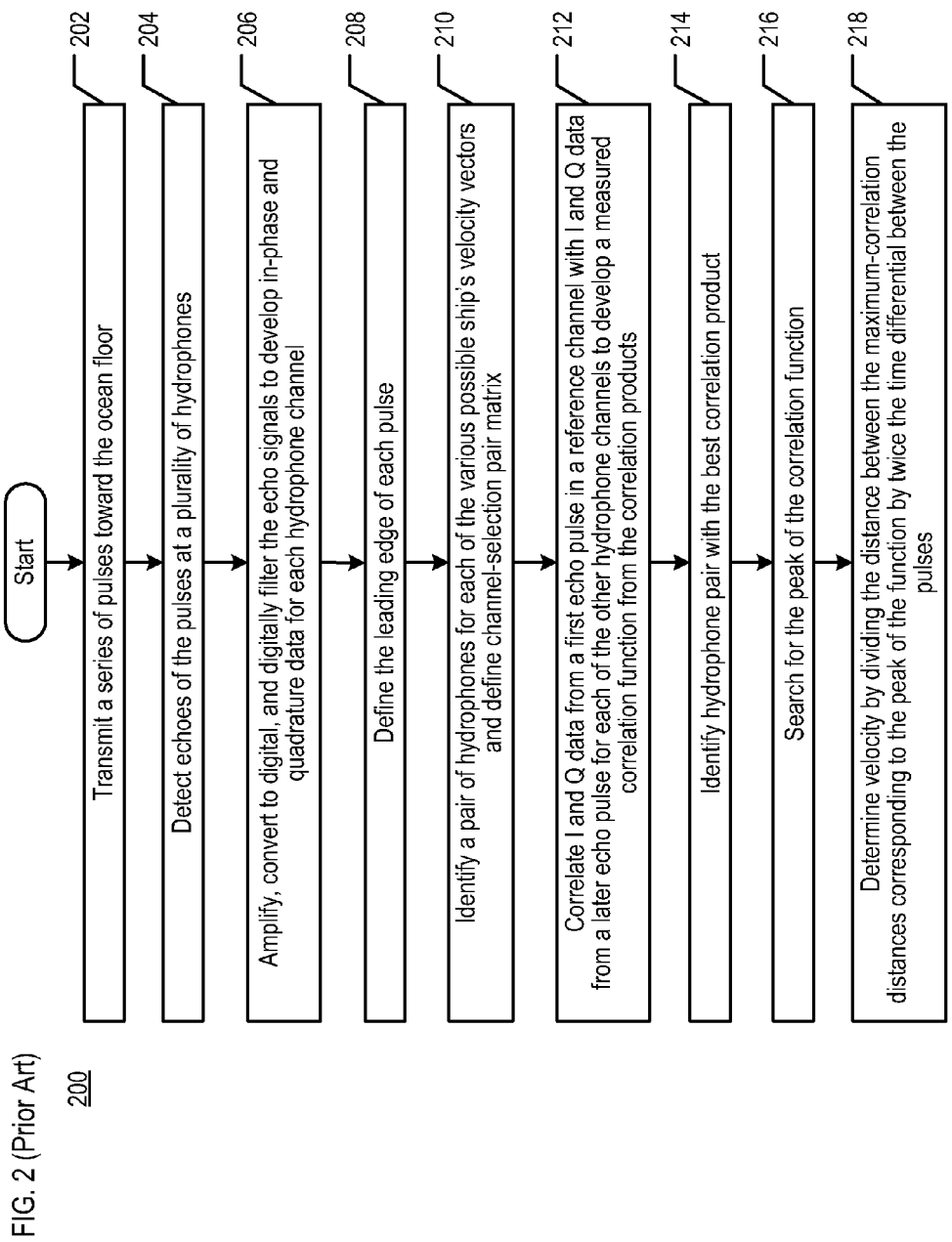
FIG. 2 depicts a prior-art method 200 for performing velocity measurement using spatial correlation SONAR.

A conventional method for performing velocity measurement via spatial correlation SONAR is discussed with respect to FIG. 2. This discussion provides background for the illustrative embodiment of the present invention.

Discussion of Conventional Velocity-Measuring Spatial Correlation Sonar.

At task 202 of method 200, a series of pulses are transmitted vertically towards the ocean bottom via transmitter 102.

At task 204, echoes are detected at each hydrophone in receiver array 104. For a ground-referenced correlation SONAR, the echoes are returned from the ocean floor. For a water-referenced correlation SONAR, the echoes are returned from the water volume beneath the ship.

At task 206, pulse echo data is amplified, converted from analog to digital, and then digitally filtered to yield in-phase ("I") and quadrature ("Q") data for each hydrophone channel. This I and Q data contains all of the amplitude and phase information contained in the echo pulses, but is base banded and thus vastly reduced in data rate from the A-to-D-converted echo signals.

In accordance with task 208, a pulse location algorithm is employed to define the leading edge of each pulse.

At task 210, a pair of prime hydrophones is identified for each of the ship's various possible velocity vectors, given the arrangement of receiver array 104. A channel-selection pair matrix, which includes all of the possible non-redundant ship's velocity vectors, is created as the result of performing task 210.

At task 212, I and Q data from a first echo pulse in a reference channel is correlated with I and Q data from a later echo pulse for each of the other channels, thereby forming a correlation product for each channel-selection pair (i.e., hydrophone pair). These individual correlation products together describe a measured correlation function.

At task 214, the hydrophone pair having the best correlation product (the "best-correlated" hydrophone pair) is identified.

At task 216, an M-by-M array of hydrophone-pair correlation products is formed (e.g., M equals three, etc.) in the channel-selection pair matrix, wherein the array is centered about the best-correlated hydrophone pair from task 214. A search for the peak of the correlation function is performed, which can possibly lie somewhere between the best-correlated hydrophone pair and another hydrophone pair in the M-by-M array. For example, an interpolation algorithm can be used on the correlation products, in order to find the location of the peak in relation to the hydrophone pairs.

The correlation function that is described by the correlation products and the peak is a relationship between i) the correlation between hydrophone pairs and ii) their displacement in the x and y directions, where "x" and "y" correspond to the fore/aft and athwart-ship directions, respectively. The location of the correlation peak provides "maximum-correlation distance" components in the fore/aft and athwart-ship directions. The velocity is determined at task 218 by dividing the maximum-correlation distance for each directional component by twice the time differential between the pulses.

Method 200 is repeated, periodically or sporadically, in order to provide successive velocity measurements.

Figure 3:
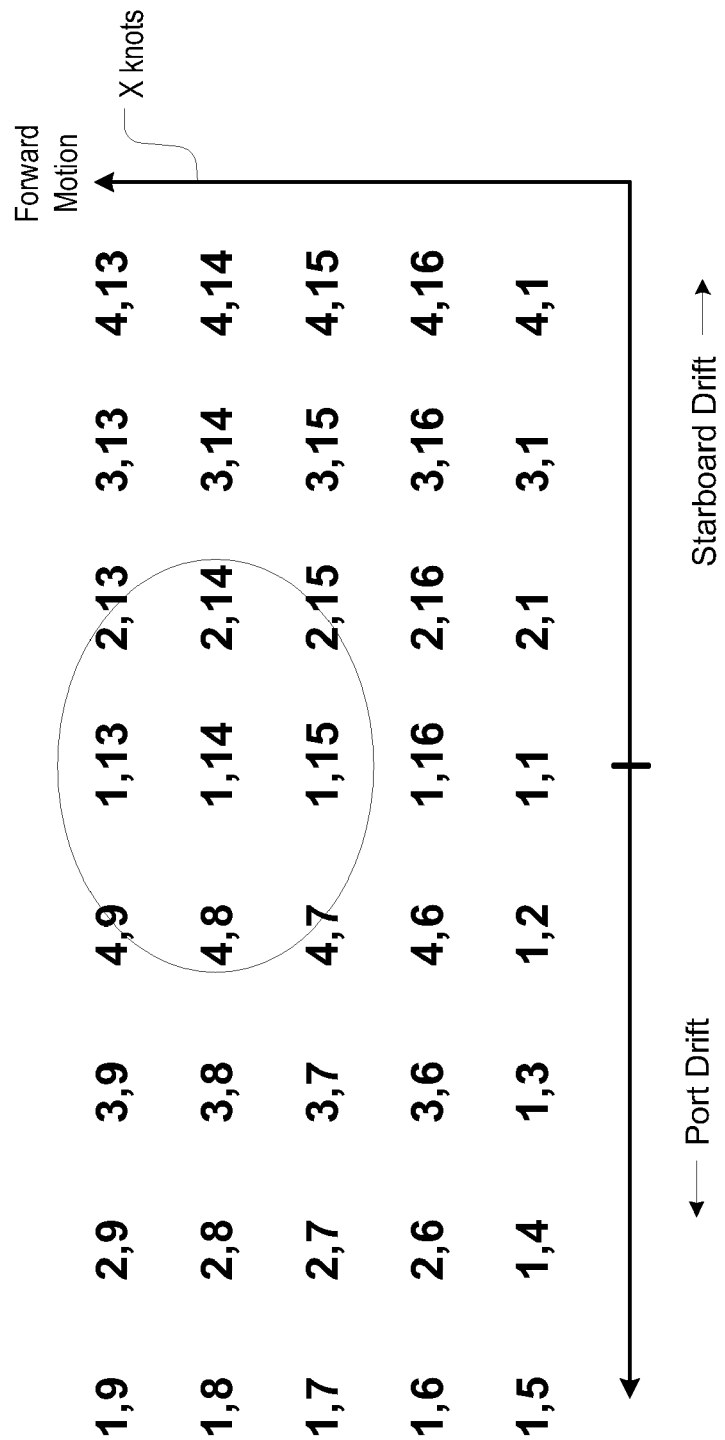
FIG. 3 depicts prior-art receiving hydrophone array pairs for peak correlation of a first pulse on one receiver and a later pulse on another receiver in the array illustrated in FIG. 1, all as a function of the velocity being measured (magnitude, forward and athwart components). The ellipse in FIG. 3 depicts receiver pairs which yield highest correlation for (x,0) velocity.

FIG. 3 depicts prior-art receiving hydrophone array pairs for peak correlation of a first pulse on one receiver and a later pulse on another receiver in the array illustrated in FIG. 1, all as a function of the velocity being measured (magnitude, forward and athwart components). The receiver pairs depicted in FIG. 3 are those that are important for forward motion; receiver pairs for backward motion are not depicted.

For example, for forward speed of x knots and athwart speed 0 knots (x,0), peak correlation will be measured between a first pulse from receiver 1 and a later pulse from receiver 14. The ellipse in FIG. 3 depicts receiver pairs which yield highest correlation for (x,0) velocity.

Figure 4:
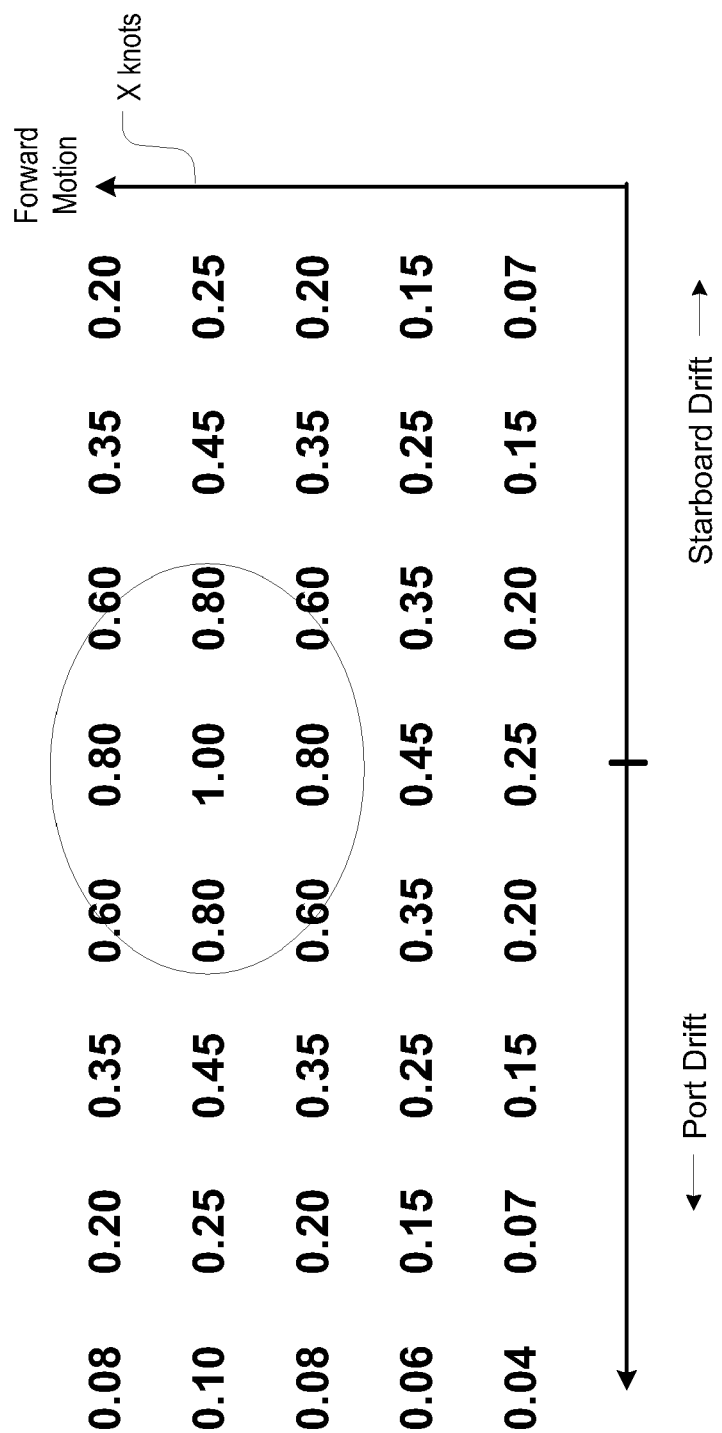
FIG. 4 depicts typical correlation magnitude in the prior art for (x,0) case in which each value corresponds to a position in the receiver pairs array of FIG. 3.

FIG. 4 depicts typical correlation magnitude for (x,0) case in which each value corresponds to a position in the receiver pairs array of FIG. 3.

Up to this point in the Detailed Description, the discussion has summarized conventional spatial correlation SONAR methodology for velocity measurement. FIG. 3 depicts receiver pairs for each velocity vector position. A variable number of "back-up" hydrophone pairs are, however, generally available for most or all such positions. For example, the pair (1,14) has back-up pairs (13,16), (5,8), (6,9), as can be readily seen with reference to FIG. 1.

In accordance with a method in accordance with the illustrative embodiment, some or all back-up hydrophone pairs are used to provide improved correlations for some or all of the velocity-vector positions. This benefit accrues due to a reduction in random and bias velocity errors at each velocity-vector position. These velocity errors result from many sources, including, without limitation:

Mechanical hydrophone installation errors;
Hydrophone acoustic center errors;
Noise effects (all noise sources, sea noise, biologics, ship's self noise, electronics self noise);
Hydrophone beam-pattern variations;
Deleterious effects of any failing or otherwise marginal components in each hydrophone receive channel processing chain (e.g., hydrophone, connections, electronics).

Details of a Method for Velocity Measurement in accordance with the Illustrative Embodiment of the Present Invention.

Figure 5:
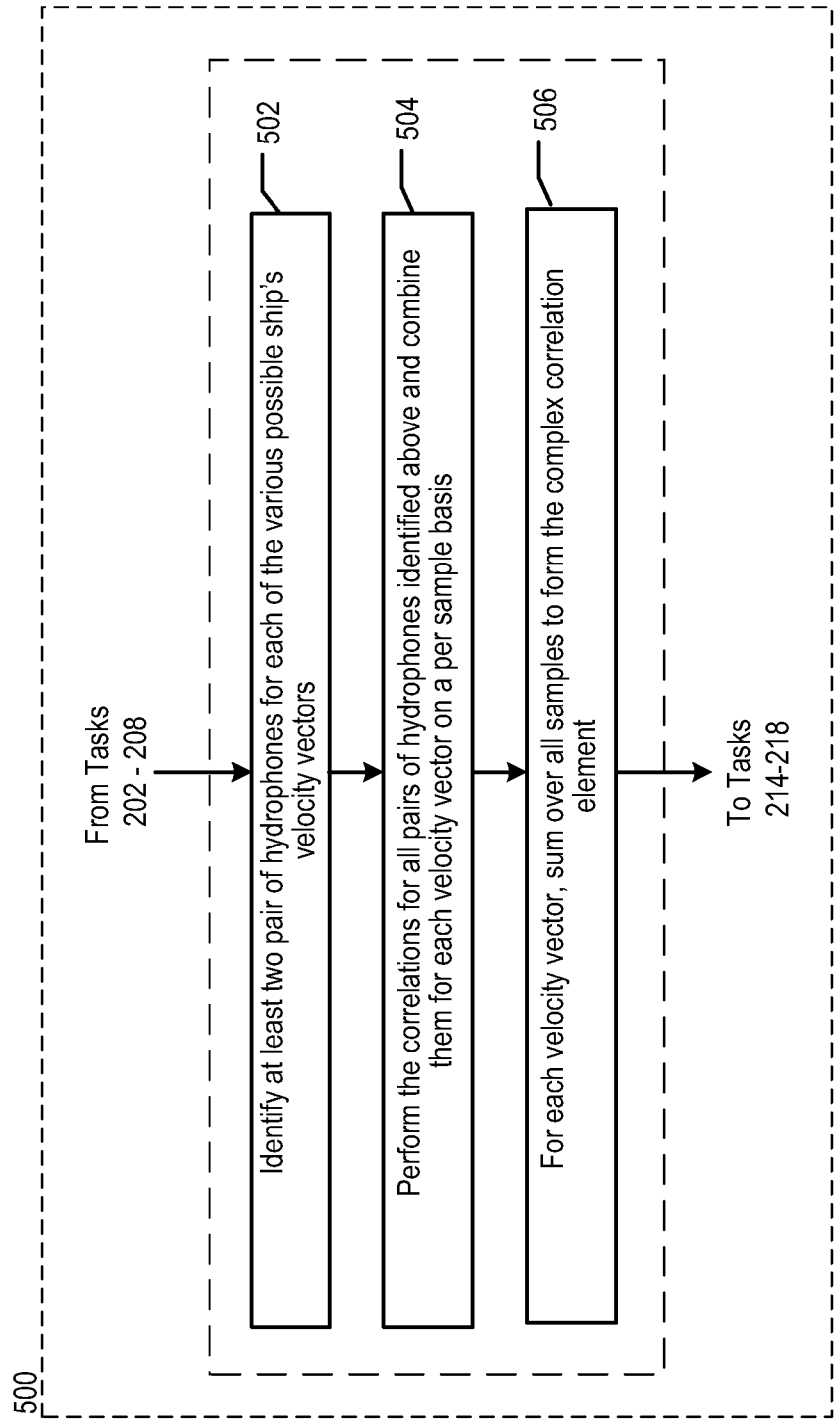
FIG. 5 depicts method 500 for performing velocity measurement using spatial correlation SONAR in accordance with the illustrative embodiment of the present invention.

FIG. 5 depicts method 500 for a velocity-measuring spatial correlation SONAR in accordance with the illustrative embodiment of the present invention. Method 500 is similar to conventional method 200; it departs therefrom at tasks 310 and 312 by developing a complex data array D(i, m, n) of I and Q data, wherein i=time sample number, m=receiver number, and n=echo number.

With respect to method 500, pulses are transmitted toward the ocean floor, an echo received by a hydrophone is amplified, analog-to-digital converted, band-pass filtered, frequency translated to baseband, and represented by In-Phase (I) and Quadrature (Q) components (tasks 202 through 206). The I and Q data contains all information about the echo (amplitude and phase) except for its known carrier frequency and is sufficient to execute correlation velocity estimation processing. The leading edge of each pulse is identified in task 208.

In accordance with task 502, two or more pairs of hydrophones for each of the various possible ship's velocity vectors are identified. In some embodiments, all available pairs of hydrophones are identified for each possible velocity vector.

In accordance with task 504, I/Q data from an early pulse on one receiver is correlated with I/Q data from a later pulse on another receiver (hydrophone channel) for all receiver vector separations. Each vector correlation yields an element of the complex correlation array. The correlation array element is defined as:

$$A(I, J) = \sum_{i}^{NS} (A(i, I, J)) \quad [1]$$

where: $I$ and $J$ are row, column indices;
$i$ is the time sample number; and
$NS$ the number of data samples in an echo,
in which:

$$A(i, I, J) = [D*(i, \text{channel 1, pulse 1}) \times D(i, \text{channel 2, pulse 2})] \quad [2]$$

Where: $D*(i, m, n)$ is the complex conjugate of $D(i, m, n)$.

I and J are A matrix row and column indices. There are specific channel pairs associated with each position. It will be understood that expressions [1] and [2] are for complex variables. As a consequence, a real and imaginary A matrix results. In some embodiments, different channel-pair information is averaged to obtain a single real and imaginary matrix.

Method 500 continues with tasks 214 through 218, which have been discussed in conjunction with method 200 (FIG. 2). It is notable that task 216 recites the use of an M-by-M array. In conjunction with method 500 (and method 600 described later in this Description), in some alternative embodiments, the array of hydrophone-pair correlation products can be an M-by-N array. In some further embodiments, the array can have any geometry for which there is more than one pair of receivers that provides the same velocity vector.

Specific Example of Method 500. For two channel pairs (Chan1, Chan2) and (Chan3, Chan4), correlate two pulses (Pulse1, Pulse2). That is, there are two channel pairs available for a particular A matrix location. Summing these averages over all samples, i, yields this one A matrix element. The correlation is executed for all channel pairs for each sample; these are then averaged over all samples.

For channel pair (Chan1, Chan2):

$$Ai,1(\text{row,column}) = Di,1*(\text{Chan1, Pulse1}) \times Di,1(\text{Chan2, Pulse2}) \quad [3]$$

and for the second channel pair (Chan3,Chan4):

$$Ai,2(\text{row,column}) = Di,2*(\text{Chan3,Pulse1}) \times Di,2(\text{Chan4, Pulse2}) \quad [4]$$

Where:
Ai,n is for sample i and is the nth channel pair to be averaged;
Di,n is an edited complex data sample for sample i, channel pair n; and
Di,n* is the complex conjugate of Di,n.

Each element of the A matrix has a real and imaginary component. Each element is first broken down into amplitude and phase, averaged, as per expressions [5] and [6] below, then converted back to real and imaginary components per expression [7]:

$$AMP_i = \frac{\sqrt{RE(A_{i,1}(\text{row, column}))^2 + IM(A_{i,1}(\text{row, column}))^2} + \sqrt{RE(A_{i,2}(\text{row, column}))^2 + IM(A_{i,2}(\text{row, column}))^2}}{2} \quad [5]$$

$$PH_i = \frac{\tan^{-1}\left(\frac{IM(A_{i,1}(\text{row, column}))}{RE(A_{i,1}(\text{row, column}))}\right) + \tan^{-1}\left(\frac{IM(A_{i,2}(\text{row, column}))}{RE(A_{i,2}(\text{row, column}))}\right)}{2} \quad [6]$$

The complex Ai(row,column) average for channel pairs Chan1, Chan2 and Chan3, Chan4 becomes:

$$Ai(\text{row,column}) = AMPi*\cos(PHi) + jAMPi*\sin(PHi) \quad [7]$$

The A matrix location (row, column) is completed by summing over all i, as per expression [8] below:

$$A(\text{row, column}) = \sum_{i=1}^{NS} A_i(\text{row, column}) \quad [8]$$

The specific example provided above is expanded and generalized to execute averages over all channel pairs for a particular (row, column) element as follows: For channel pairs n=1 to y and pulses P1, P2 and sample i (see expressions [3] and [4], above):

$$Ai,n(I,J) = Di,n*(\text{Ch}1n,P1) \times Di,n(\text{Ch}2n,P2) \quad [9]$$

As before, each element is broken down into amplitude (expression [10] below) and phase (expression [11] below) (see also, expressions [5] and [6], above), and averaged as per expression [12] below:

$$AMP_i(I, J) = \frac{\sum_{n=1}^{y} \sqrt{RE(A_{i,n}(I, J))^2 + IM(A_{i,n}(I, J))^2}}{y} \quad [10]$$

$$PH_i(I, J) = \frac{\sum_{n=1}^{y} \tan^{-1}\left(\frac{IM(A_{i,n}(I, J))}{RE(A_{i,n}(I, J))}\right)}{y} \quad [11]$$

The average complex Ai(I,J) for all y channel pairs (see expression [7] above) is:

$$Ai(I,J) = AMPi(I,J)*\cos(PHi(I,J)) + jAMPi*(I,J)\sin(PHi(I,J)) \quad [12]$$

The A matrix location (row, column) is completed by summing over all I, as per expression [13] below (see expression [8], above):

$$A(I, J) = \sum_{i=1}^{NS} A_i(I, J) \quad [13]$$

Where: A(I, J) is the average over all channel pairs for matrix position I, J.

Figure 6:
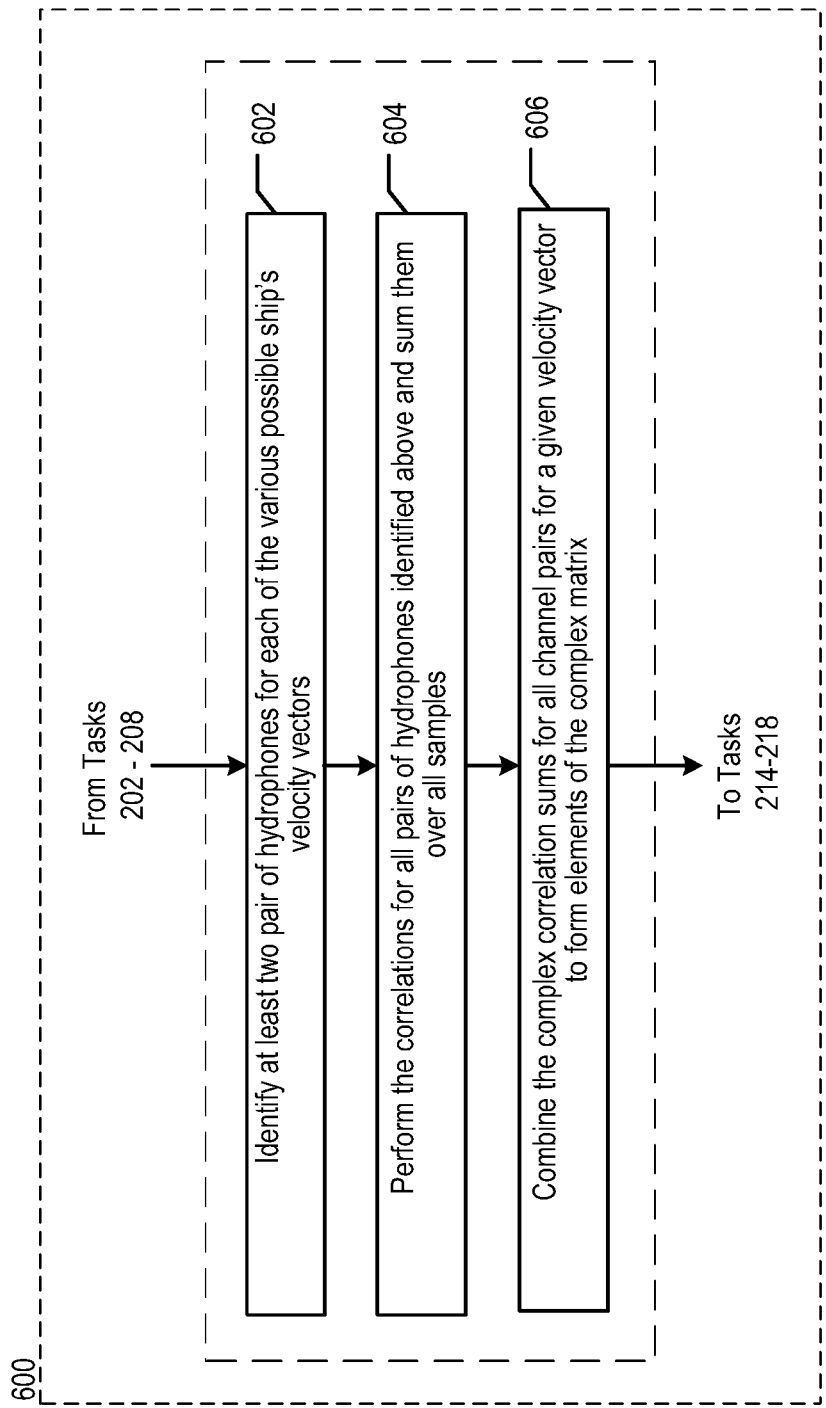
FIG. 6 depicts alternative method 600 for performing velocity measurement using spatial correlation SONAR.

In method 600 depicted in FIG. 6, the cross correlation is first calculated as per expression [14] (see expression [9] above), then summed over the samples as per expression [15] (see expression [12] above), and then different channel pairs are averaged for each array position.

For channel pair z (ch1, ch2), with sample i for index (row, column) of the A matrix:

$$Ai,z(I,J) = Di,z*(\text{Ch}1,P1) \times Di,z(\text{Ch}2,P2) \quad [14]$$

For channel pairs z=1 to y, where y is the number of channel pairs available for this array position, each element is broken down into amplitude (expression [16] below) and phase (expression [17] below) (see also, expressions [10] and [11], above):

$$AMP(I, J) = \frac{\sum_{z=1}^{y} \sqrt{RE(A_z(I, J))^2 + IM(A_z(I, J))^2}}{y} \quad [16]$$

$$PH(I, J) = \frac{\sum_{z=1}^{y} \tan^{-1}\left(\frac{IM(A_z(I, J))}{RE(A_z(I, J))}\right)}{y} \quad [17]$$

The real and imaginary parts of the amplitude and phase averages calculated above are next combined to form the A matrix elements, as per expression [18]:

$$A(I,J) = AMP(I,J)*Cos(PH(I,J)) + jAMP*(I,J)Sin(PH(I,J)) \quad [18]$$

Where: A(I, J) is the complex correlation over all channel pairs for matrix position (I,J).

Thus, illustrative method 500 performs combining processing over samples and alternative method 600 performs combining processing over channels or receivers. Compared to method 500, method 600 reduces the amount of averaging required, and, as a result, is faster and more efficient.

These methods can be applied to an existing spatial correlation SONAR system without changes thereto except for software (i.e., no changes to sensors or processing hardware are required).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   identifying, in processing electronics, at least two pair of receivers for all possible velocity vectors for a moving object;
   forming correlations, in the processing electronics, using spatial correlation techniques, for data samples comprising In-phase and Quadrature components for all pairs of identified receivers;
   combining the correlations in the processing electronics for each of the velocity vectors;
   forming a correlation array element in the processing electronics by summing over all correlations for each velocity vector;
   forming a correlation array in the processing electronics from all of the correlation array elements; and
   determining velocity of the moving object using the correlation array.

2. The method of claim 1 wherein all available pairs of receivers are identified in the processing electronics for each possible velocity vector.

3. The method of claim 1 further comprising:
   receiving a signal at a receiver;
   processing the signal, whereby the processing comprises sampling the signal and representing each sample in terms of the In-Phase (I) and the Quadrature (Q) components.

4. The method of claim 3 wherein the task of processing the signal further comprises:
   amplifying the signal;
   digitizing the signal;
   bandpass filtering the signal; and
   frequency translating the signal to baseband.

5. The method of claim 3 wherein the receiver is a hydrophone.

6. The method of claim 3 wherein the receiver is an antenna element.

7. The method of claim 3 further comprising transmitting a pulse, wherein the signal is an echo of the pulse.

8. The method of claim 7 wherein the pulse is transmitted through water.

9. A method for determining velocity of a moving object via spatial correlation techniques, wherein the method comprises:
   transmitting a series of pulses from the moving object and detecting echoes of the pulses at a plurality of receivers;
   generating, in processing electronics, in-phase and quadrature data from data pertaining to the echoes;
   identifying, in the processing electronics, at least two pairs of receivers for all possible velocity vectors for a moving object;
   forming, in the processing electronics, a correlation array comprising correlation array elements developed from data obtained from the at least two pairs of receivers for all the velocity vectors; and
   determining velocity of the moving object using the correlation array.

10. The method of claim 9 wherein the operation of identifying at least two pairs of receivers further comprises identifying all available receiver pairs for each velocity vector and wherein the operation of forming a correlation array further comprises forming, in the processing electronics, a correlation array comprising correlation array elements developed from data obtained from all available receiver pairs for each velocity vector.

11. The method of claim 9 wherein the operation of forming a correlation array further comprises:
   correlating, in the processing electronics, using spatial correlation techniques, data from the at least two receiver pairs;
   combining, in the processing electronics, the correlated data for each velocity vector; and
   forming, in the processing electronics, a complex correlation element by summing, for each velocity vector, the correlated data.

12. The method of claim 9 wherein the operation of forming a correlation array further comprises:
   correlating, in the processing electronics, using spatial correlation techniques, data from the at least two receiver pairs;
   forming complex correlation sums by summing, in the processing electronics, the correlated data for each velocity vector; and
   forming a complex correlation element, in the processing electronics, by combining the complex correlation sums for the at least two receiver pairs for each velocity vector.

13. A method comprising:
   identifying, in processing electronics, at least two pairs of receivers for all possible velocity vectors for a moving object;
   forming correlations, in the processing electronics, using spatial correlation techniques, for data samples comprising In-Phase and Quadrature components for the at least two pairs of identified receivers;

forming a plurality of complex correlation sums for the at least two pair of identified receivers by summing, in the processing electronics, all correlations for each velocity vector;

forming a correlation array element by combining, in the processing electronics, for the at least two pairs of identified receivers for each given velocity vector, the complex correlation sums;

forming a correlation array in the processing electronics from all of the correlation array elements; and determining velocity of the moving object using the correlation array.

14. The method of claim 13 wherein all available pairs of receivers are identified, in the processing electronics for each possible velocity vector.

* * * * *